June 29, 1954  F. R. SHONKA ET AL  2,682,583
CONTACTING DEVICE
Filed Sept. 3, 1952
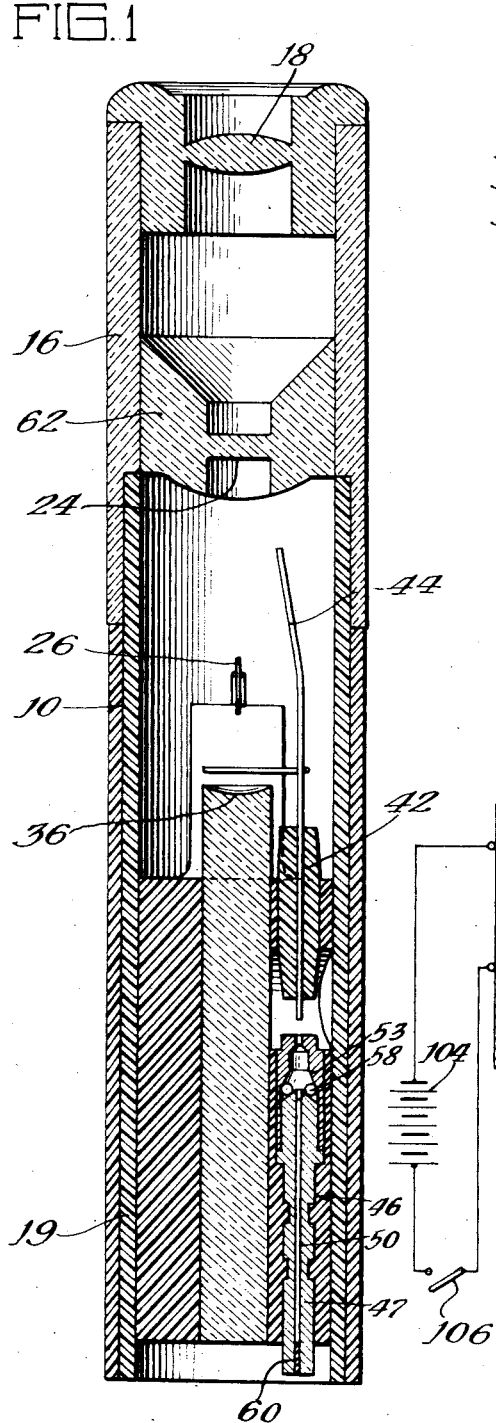
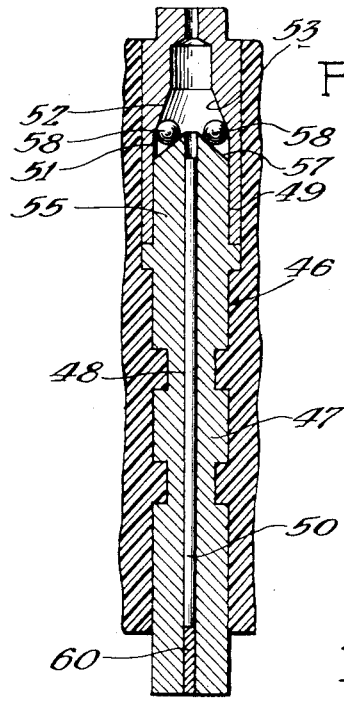
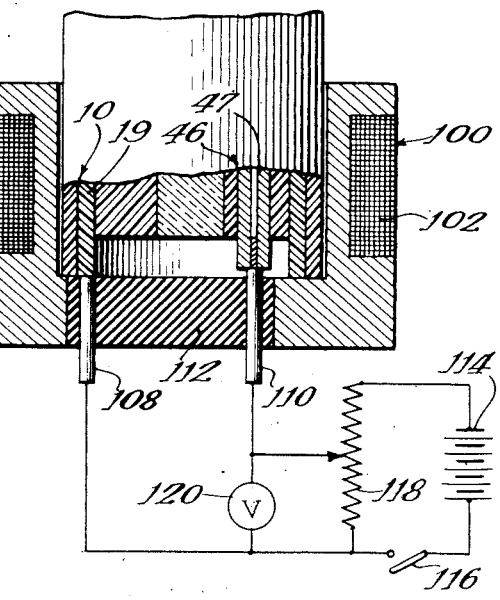
INVENTORS.
Francis R. Shonka
Richard F. Setman
By: Roland A. Anderson
Attorney Patented June 29, 1954

2,682,583

UNITED STATES PATENT OFFICE 2,682,583

CONTACTING DEVICE

Francis R. Shonka, Riverside, and Richard F. Selman, Chicago, Ill., assignors to the United States of America as represented by the United States Atomic Energy Commission Application September 3, 1952, Serial No. 307,628

7 Claims. (Cl. 200—87)

This invention relates to electrical switches which are adapted to be used in radiation dosimeters.

For many years, it has been well known that overdoses of radiation can be injurious to the human body, and that it is necessary to observe precautions in order to avoid such overdoses when working with sources of radiations, such as radioactive materials. It has been found, that the effects of radiation upon the human body are cumulative, and that it takes the human body a substantial period of time to fully recover from the effects of even a small dose of radiation. For this reason, it is customary for persons engaged in occupations using radiations to carry radiation dosimeters with them at all times, dosimeters being instruments which record the amount of radiation to which the carrier has been subjected. In this manner, the total amount of radiation that a person has been subjected to during a period of time may be determined.

Many of the dosimeters presently being used utilize ionization chambers which receive an electrical charge at the beginning of the period in which they are to measure radiation dosage. At the end of the period, the amount of charge remaining upon the ionization chamber is again measured, and the loss of charge is a measurement of the amount of radiation to which the instrument has been subjected. However, it has been found that such instruments may partially loose their charge as a result of electrical leakage across the surface of the instrument between the charging terminals, hence recording a radiation measurement greater than the radiation actually experienced by the instrument since it was last charged.

The present invention eliminates this source of error by physically separating an electrode of the ionization chamber from its terminal on the outer surface of the casing of the dosimeter. This is done entirely within a sealed moistureproof chamber by means of a magnetic switch, which is hereafter to be described.

Magnetic switches which operate within sealed moistureproof chambers have been used in the past, the patent application of Francis R. Shonka, Serial No. 228,718, filed May 28, 1951, being an example. However, such switches formerly known in the art have been difficult to fabricate, and often require precision workmanship. It is hence an object of the present invention to provide an electrical switch which may be operated within a sealed chamber from the exterior thereof, and which may be readily fabricated without high precision operations.

Other objects and advantages of the present invention will be readily apparent to the man skilled in the art from a further reading of the present specification and claims, particularly when viewed in the light of the drawings, in which:

Figure 1 is an elongated sectional view of a radiation dosimeter utilizing an electrical switch constructed in accordance with the present invention;

Figure 2 is an enlarged fragmentary sectional view of the electrical switch shown in Figure 1; and Figure 3 is a sectional view of a device for charging the dosimeter of Figure 1.

The radiation dosimeter is provided with a casing 10 hermetically sealing the elements of the instrument from the ambient atmosphere. A portion 16 of the casing 10 is transparent to the passage of light, and an eyepiece 18 is disposed within this end of the instrument. An electrometer 26 is disposed centrally within the instrument and electrically connected to an electrically conducting portion 19 of the casing 10.

A combination scale and light director 62 is disposed within the casing 10 between the electrometer 26 and the eyepiece 18 to focus light entering through the transparent portion 16 of the casing 10 upon the fiber 26. A concave reflecting objective 36 is disposed adjacent to the fiber 26 on the opposite side of the eyepiece 18, and forms an image of the fiber 26 upon the scale 24.

A deflecting electrode 44 is also mounted adjacent to the fiber 26, and is insulated from the other elements of the dosimeter by means of an insulator 42. Adjacent to one end of the deflecting electrode 44 is disposed a contacting device 46.

The contacting device 46 is provided with a nonmagnetic electrically conducting housing 47 elongated in shape and provided with a bore 48 along its axis. The housing 47 has two portions, the one portion 49 having an aperture 51 with a conically tapered end 53. The other portion 55 of the housing 47 fits snugly into the aperture 51 and also has a conically tapered end 57. The ends 53 and 57 of the two portions 49 and 55 are spaced from each other, thus forming a cavity 52 therebetween. Two nonmagnetic balls 58 with diameters greater than the diameter of the bore 48 are disposed within the cavity 52. A pin 50 constructed of ferromagnetic material is disposed within the bore 48 in the casing 47. The pin 50 is constructed of any electrically conducting ferromagnetic material, such as iron or steel, and is magnetically polarized. The pin 50 is restrained from sliding out of the bore 48 through the end opposite the cavity 52 by a plug 60 constructed of ferromagnetic material, such as iron or steel, which also is magnetically polarized, the end of the pin 50 being polarized magnetically opposite to the adjacent portion of the plug 60. In this manner, the pin 50 and the plug 60 are magnetically attracted to each other.

Contact is made between the deflecting electrode 44 and the housing 47 of the contacting device 46 by placing the contacting device 46 in a magnetic field with the deflecting electrode 44 above the housing 47. In this manner, the two non-magnetic balls fall away from the bore 48 in the cavity 52 and allow the magnetic field to draw the pin 50 away from the plug 60 and through the cavity 52 into contact with the deflecting electrode 44.

A suitable magnetic device for affecting this electrical contact is shown in Figure 3. It consists of a socket 100 having a diameter slightly greater than the diameter of the casing 10 of the dosimeter. The socket 100 is provided with windings 102 of electrically conducting wire thereabout. The windings 102 are connected to a source of current 104 through an electrical switch 106.

The charging socket 100 is also provided with two electrical contact pins 108 and 110 extending through an electrically insulating disc 112 in the base of the socket 100. The pins 108 and 110 are adapted to contact the electrically conducting portion 19 of the casing 10 of the dosimeter and the housing 47 of the contacting device 46, as shown in Figure 3. The pins 108 and 110 are connected to a source of charge, such as battery 114 through a switch 116 and a potentiometer 118. A voltmeter 120 is connected across the potentiometer 118 to measure the potential to which the ionization chamber of the dosimeter is being charged.

When the dosimeter is placed in the socket 100 with the contacting device 46 beneath the deflecting electrode 44, the switch 106 may be closed setting up an electrical field which is effective to raise the pin 50 from the bore 48 into contact with the deflecting electrode 44. The switch 116 may be closed applying an electrical potential between the housing 47 of the contacting device 46 and the electrically conducting portion 19 of the casing 10 of the dosimeter.

It will be readily seen, that the likelihood of electrical contact between the deflecting electrode 44 and the pin 50 has been minimized by two separate means. The nonmagnetic balls 58 within the cavity 52 are free to interfere with the passage of the pin 50 through the bore 48 except when the dosimeter is placed in a vertical position, that is, a position in which the contacting device 46 is beneath the deflecting electrode 44. Also, the magnetic attraction between the pin 50 and the plug 60 retains the pin 50 adjacent to the plug 60 except when removed by a superior force. The man skilled in the art will readily devise many modifications and other embodiments of the present invention from the teachings set forth in this specification. Hence, it is intended that the scope of the present invention be not limited by the foregoing disclosure, but rather only by the appended claims.

What is claimed is:

1. An electrical switch comprising, in combination, a housing having a bore extending therein from a mouth, a cavity within the housing intersecting the bore near the mouth thereof, at least one nonmagnetic ball disposed within the cavity with a diameter greater than the diameter of the bore, the cavity having a region in which the shortest normal distance from the bore to the surface of the cavity exceeds the diameter of the ball and also a second region in which the normal distance from the bore to the surface of the cavity is less than the diameter of the ball so that the ball is effective to block the bore when in said second region, a rod constructed of ferromagnetic material slidably disposed within the bore, an electrical contact insulatingly mounted adjacent to the mouth of the bore, and magnetic means to withdraw the rod from the bore.

2. An electrical switch comprising, in combination, a housing constructed of nonmagnetic electrically conducting material having a bore extending therein, a cavity within the housing intersecting the bore near the mouth thereof, said cavity tapering into the bore toward the mouth thereof, at least one nonmagnetic ball disposed within the cavity with a diameter greater than the diameter of the bore, a rod constructed of ferromagnetic material slidably disposed within the bore, a plug in the end of the bore opposite to the mouth thereof, said plug being constructed of magnetic material and being magnetically polarized opposite to the magnetic polarization of the rod, an electrical contact insulatingly mounted adjacent to the mouth of the bore, and means to apply a magnetic field through the housing for withdrawing the rod from the mouth of the bore into contact with the electrical contact.

3. An electrical switch comprising, in combination, a housing constructed of nonmagnetic electrically conducting material having a bore extending therein from a mouth, said housing having two parts, the one part having an aperture extending therein coaxially with the bore and having a larger diameter than the bore, and the other part snugly fitting into said aperture, said housing being provided with a cavity between the first and second parts, and said housing having a plug of magnetically polarized material disposed in the end of the bore opposite to the mouth, a pair of nonmagnetic balls disposed within the cavity in the housing, said balls having a diameter greater than the diameter of the bore, a rod magnetically polarized opposite to the plug slidably disposed within the bore, an electrical contact insulatingly mounted adjacent to the mouth of the bore, and magnetic means exterior to the housing for withdrawing the rod through the bore into contact with the electrical contact.

4. An electrical switch comprising the elements of claim 3 wherein the housing and ball are constructed of brass.

5. A hermetically sealed electrical switch comprising, in combination, an envelope impervious to the passage of fluids, a switch housing constructed of nonmagnetic electrically conducting material having a bore extending therein from a mouth mounted within the envelope and extending therethrough, the mouth of said switch housing being on the interior of said envelope and the opposite end of said switch housing being on the exterior of said envelope, an electrical contact insulatingly mounted from the switch housing adjacent to the mouth of the bore, a cavity disposed within the housing tapering into the mouth of the bore, at least one nonmagnetic ball disposed within the cavity having a diameter greater than the diameter of the bore, a rod constructed of electrically conducting magnetic material slidably disposed within the bore of the housing, and means exterior to the envelope to apply a magnetic field through the housing and move the rod through the mouth of the bore into contact with the electrical contact.

6. A hermetically sealed electrical switch comprising, in combination, an envelope impermeable to fluids, a switch housing constructed of nonmagnetic electrically conducting material disposed within the envelope, said housing having a bore extending therein from a mouth, the mouth of the bore being disposed within the sealed envelope and the other end of the housing being disposed on the exterior of the envelope, said housing having two parts, the one part having an aperture extending therein from one end coaxial with the bore, and the other part being disposed on contactual relationship within the aperture, a cavity being provided between the first and second parts of the housing having a taper toward the mouth of the bore, a pair of nonmagnetic balls disposed within the cavity having diameters greater than the diameter of the bore, a magnetically polarized rod constructed of ferromagnetic material slidably disposed within the bore, a plug disposed within the bore on the end opposite to the mouth magnetically polarized opposite to the polarization of the rod, an electrical contact insulatingly mounted from the housing adjacent to the mouth of the bore, and magnetic means exterior to the envelope to apply a magnetic field through the housing and to withdraw the magnetic rod through the mouth of the bore into contact with the electrical contact.

7. An electrical switch comprising, in combination, a housing constructed of nonmagnetic electrically conducting material, said housing having a bore extending therein from a mouth, said housing having two parts, the one part having an aperture extending therein from one end coaxial with the bore, and the other part being disposed in contactual relationship within the aperture, a cavity being provided between the first and second parts of the housing having a taper toward the mouth of the bore, a magnetically polarized plug disposed in the end of the bore opposite to the mouth thereof, a pair of nonmagnetic balls disposed within the cavity having diameters greater than the diameter of the bore, a magnetically polarized rod constructed of ferromagnetic material slidably disposed within the bore, and an electrical contact mounted adjacent to the mouth of the bore, said contact being electrically insulated from the housing.

References Cited in the file of this patent

UNITED STATES PATENTS

| Number | Name | Date |
|---|---|---|
| 650,905 | Ochs | June 5, 1900 |
| 999,850 | Palmer | Aug. 8, 1911 |
| 1,277,576 | Hart | Sept. 3, 1918 |
| 2,342,527 | Bucklen | Feb. 22, 1944 |
| 2,613,327 | Beckman et al. | Oct. 7, 1952 |
| 2,617,044 | Neher | Nov. 4, 1952 |
| 2,630,535 | Landsverk | Mar. 3, 1953 |

FOREIGN PATENTS

| Number | Country | Date |
|---|---|---|
| 603,337 | Germany | Oct. 5, 1934 |
| 825,324 | France | Dec. 8, 1937 |